(12) United States Patent
Phipps et al.

(10) Patent No.: US 7,053,776 B2
(45) Date of Patent: May 30, 2006

(54) CONTROL OF PROGRAMMABLE MODULES

(75) Inventors: William H. Phipps, Fairport, NY (US); Heiko Rommelmann, Penfield, NY (US); Alberto Rodriguez, Webster, NY (US); Scott J. Bell, Webster, NY (US); Ronald P. Boucher, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 161 days.

(21) Appl. No.: 10/849,976

(22) Filed: May 20, 2004

(65) Prior Publication Data

US 2005/0258932 A1  Nov. 24, 2005

(51) Int. Cl.
*G08B 13/14* (2006.01)
(52) U.S. Cl. ............... 340/572.1; 340/572.4; 340/539.13; 340/539.19; 340/825.49; 340/825.69
(58) Field of Classification Search ............ 340/572.1, 340/572.4, 539.13, 539.19, 426.13, 426.14, 340/10.4, 10.41, 10.52, 825.49, 825.69; 235/383, 235/385, 492
See application file for complete search history.

(56) References Cited

U.S. PATENT DOCUMENTS

| | | | | |
|---|---|---|---|---|
| 6,008,727 A | 12/1999 | Want et al. | ............... | 340/572.1 |
| 6,078,251 A * | 6/2000 | Landt et al. | ............. | 340/10.41 |
| 6,176,425 B1 | 1/2001 | Harrison et al. | ............ | 235/385 |
| 6,262,662 B1 | 7/2001 | Back et al. | ............... | 340/572.1 |
| 6,326,946 B1 | 12/2001 | Moran et al. | ................ | 345/156 |
| 6,346,884 B1 | 2/2002 | Uozumi et al. | .......... | 340/572.1 |
| 6,351,621 B1 | 2/2002 | Richards et al. | ............ | 399/111 |
| 6,584,290 B1 | 6/2003 | Kurz et al. | .................... | 399/12 |
| 6,969,134 B1 * | 11/2005 | Hohberger et al. | ............ | 347/2 |
| 2005/0258228 A1 | 11/2005 | Rommelmann et al. | | |
| 2005/0258931 A1 | 11/2005 | Rommelmann et al. | | |
| 2005/0258962 A1 | 11/2005 | Phipps et al. | | |
| 2005/0258963 A1 | 11/2005 | Rodriquez et al. | | |

OTHER PUBLICATIONS

*Applications*, Intermec—Authentication, Applications for Flying Null Technology, www.flying-null.com, May 20, 2003.
*Flying Null*, A Unique Product Indentity, Flying Null Technology—the new concept in remote magnetic sensing, www.flying-null.com, May 20, 2003.
Copending U.S. Appl. No. 10/458,848, filed Jun. 11, 2003, entitled "Printer Module With On-Board Intelligence," by Heiko Rommelmann et al.

* cited by examiner

*Primary Examiner*—Hung Nguyen
(74) *Attorney, Agent, or Firm*—David J. Arthur

(57) ABSTRACT

Programming an electronic monitoring tag attached to a printing apparatus replaceable module includes electronically reading tag identification data from an electronic monitoring tag associated with the replaceable module, and electronically verifying that the tag identification data matches predetermined identification criteria. If the tag identification data matches the predetermined identification criteria, electronically programming the electronic monitoring tag with tag content.

17 Claims, 13 Drawing Sheets

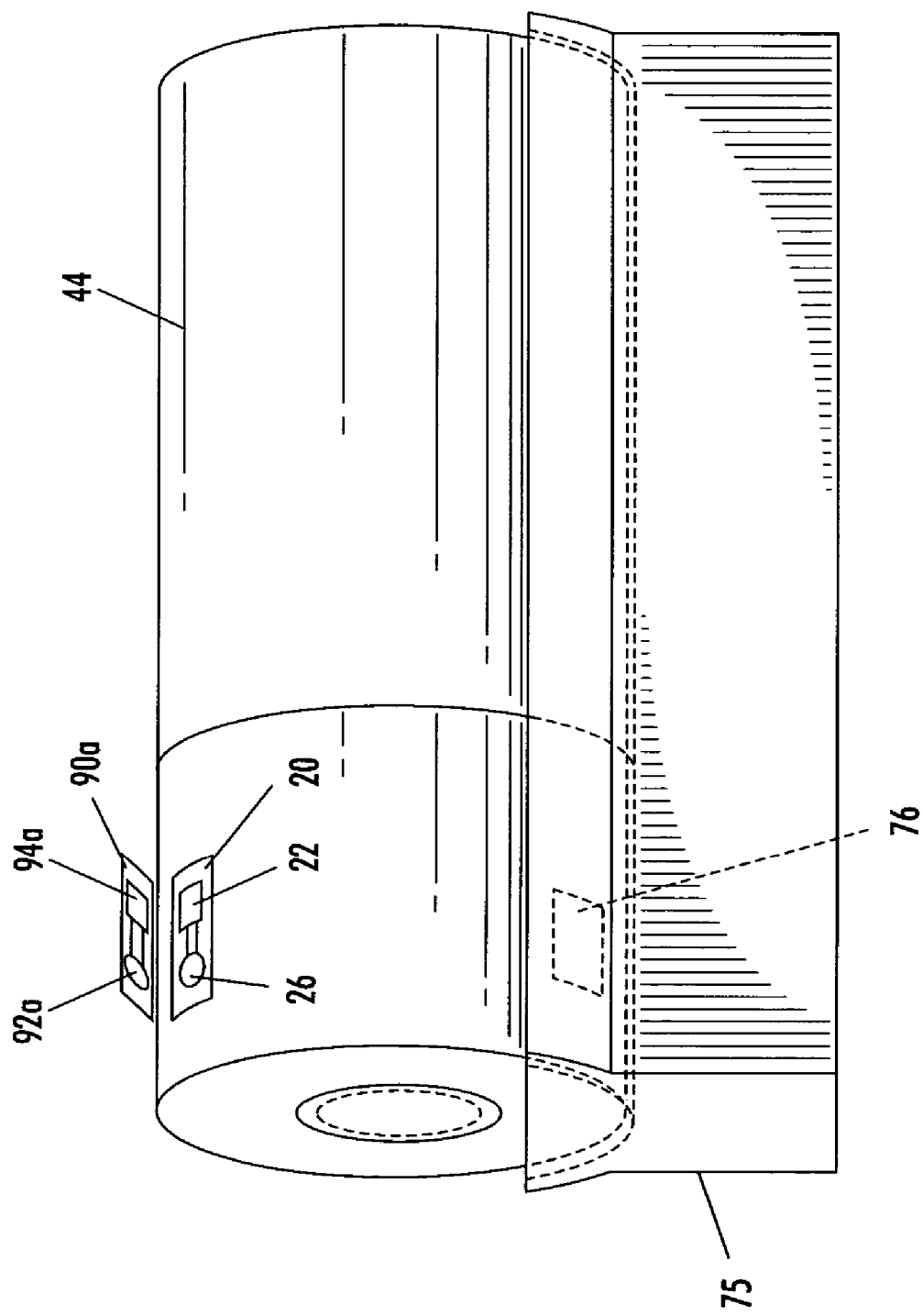

CONTROL OF PROGRAMMABLE MODULES

CROSS-REFERENCE TO RELATED APPLICATIONS

Reference is made to commonly-assigned copending U.S. patent application Ser. No. 10/849,686, now U.S. Publication No. 20050258962, May 20, 2004, entitled "Control of Programmable Modules," by Heiko Rommelmann et al., copending U.S. patent application Ser. No. 10/850,190, now U.S. Publication No. 20050258963, filed May 20, 2004, entitled "Diagnosis of Programmable Modules." by Heiko Rommelmann et al., copending U.S. patent application Ser. No. 10/849,973, now U.S. Publication No. 20050258931, filed May 20, 2004, entitled "Control of Packaged Modules," by Heiko Rommelmann et al., copending U.S. patent application Ser. No. 10/849,974, now U.S. Publication No 20050268228, filed May 20, 2004, entitled "Control of Programmable Modules," by Heiko Rommelmann et al., the disclosures of which are incorporated herein.

BACKGROUND AND SUMMARY

The present invention relates to control of programmable devices or modules. In one aspect, the present invention is particularly useful in inventory and configuration control of modules that are physically identical but can be programmed with alternative configurations.

Various systems allow a user to track items such as manufactured devices or packages. For example, a barcode containing a model number or a serial number or other identifying indicia can be printed on a device or a package. An optical scanner connected to a tracking system can scan the barcode, so that the tracking system can determine the identity and location of the marked item. Such barcode systems rely on "line of sight" access from the barcode reader to the barcode on the item being tracked. In addition, while the tracking system can record various information pertaining to the location and status of the tracked item, the tracked item itself does not retain any information as to where it has been, or what processing steps have been performed on it.

More recently, radio frequency identification (RFID) devices include radio frequency transmitters that have been applied to products for tracking purposes. Such RFID devices contain information that they can transmit to a reader. The radio frequency transmitters do not require "line of sight" access from the reader.

Magnetic tags and sensors have also been demonstrated to track and verify the identity of products. Magnetic tags require close proximity between the information bearing tag and the sensor.

In various instances, holders or transporters of products may wish to alter certain information pertaining to a particular product after the product has been manufactured and entered the distribution channel. For example, a person may wish to know when a product passed through a particular stage in the distribution channel. Such information is important to maintain the freshness of time-sensitive inventory. Also, for certain types of products, such information can be used to detect if the product may have been inappropriately detoured along the distribution channel, which detours could indicate tampering or other mishandling of the product.

In other instances, certain families of products may be physically identical but have different programmable characteristics. If the programmable characteristics are set to create separate "products" when the product first enters the distribution channel, inventory control is complicated because the holder of the inventory must manage the inventory of several different products.

In accordance with an aspect of the present invention, programming an electronic monitoring tag attached to a printing apparatus replaceable module includes electronically reading tag identification data from an electronic monitoring tag associated with the replaceable module, and electronically verifying that the tag identification data matches predetermined identification criteria. If the tag identification data matches the predetermined identification criteria, electronically programming the electronic monitoring tag with tag content.

In accordance with another aspect of the present invention, a programming device for programming electronic monitoring tags that are associated with printing apparatus replaceable modules, includes a tag writer adapted to program tag content into electronic monitoring tags, and a tag reader. The tag reader is adapted to read tag identification data from a first electronic monitoring tag associated with a printing apparatus replaceable module. The programming device also includes a data verifier that communicates with the tag reader. The data verifier is adapted to determine if the read tag identification data matches predetermined tag identification criteria, and to authorize the tag writer to program the tag content into the first electronic monitoring tag only if the data verifier determines that the tag identification data matches the tag identification criteria.

BRIEF DESCRIPTION OF THE DRAWINGS

FIG. 15 is a simplified elevational view of the installation of a portion of the printing apparatus of FIG. 12.

DETAILED DESCRIPTION

Programmable tags are attached to, or otherwise associated with, various types of products, such as replaceable modules for printing apparatus or other machinery. Such programmable tags include a tag memory in which information can be stored.

Figure 1:
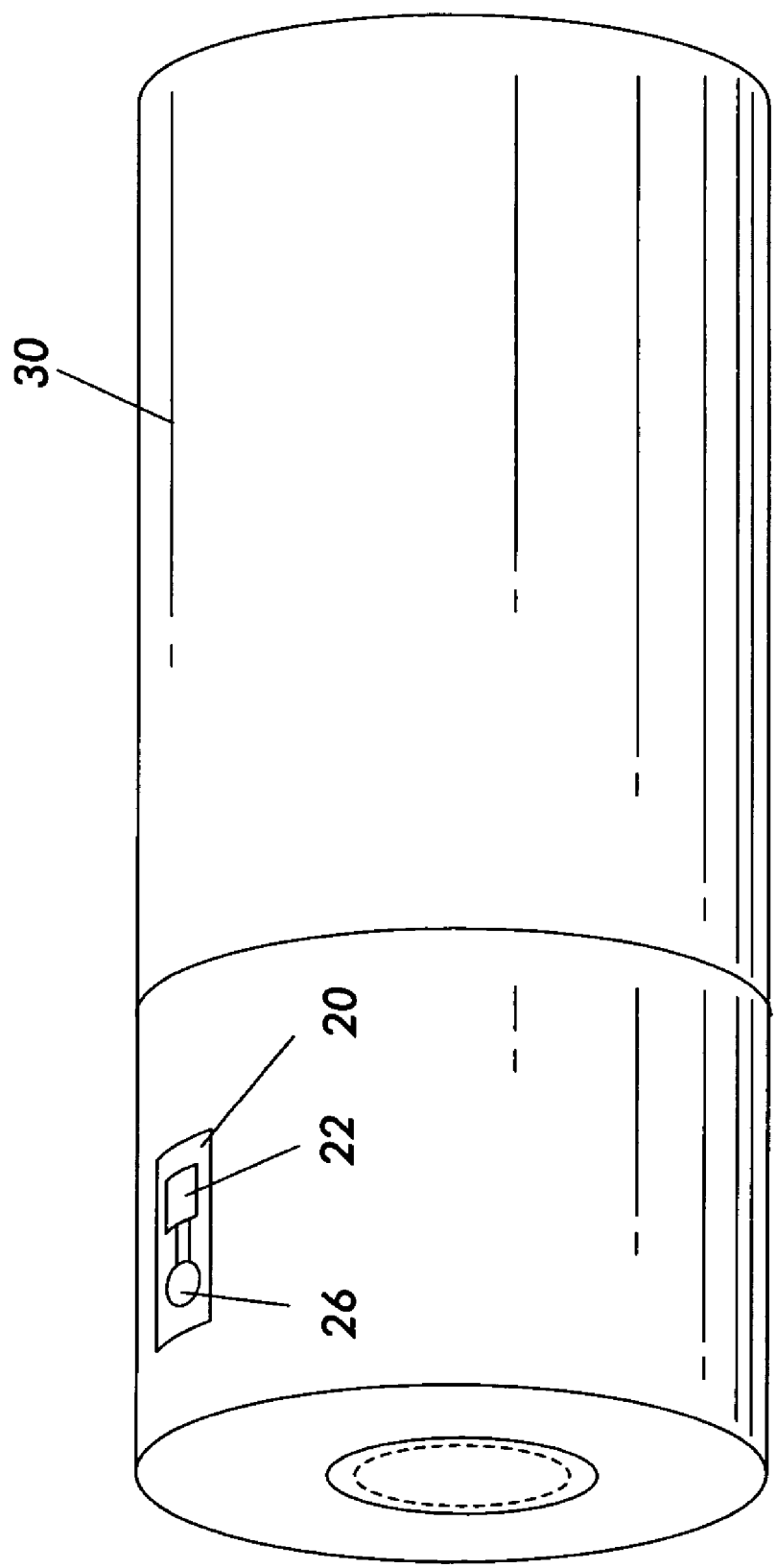
FIG. 1 shows an exemplary application of a programmable module tag to a module.

Referring to FIG. 1, a programmable electronic module tag 20 is associated with a module, such as a replacement part or consumable element for machinery or systems. Particular implementations will be described in the context of a consumable module for a printing apparatus, in particular a toner cartridge 30 containing consumable toner. The cartridge 30 is intended for insertion into a xerographic printing apparatus, in which toner is dispensed from the cartridge for use in the printing process. Although this one particular application is described, the person of skill in the art, having reviewed the subject disclosure, will recognize that the principles thereof can be applied to a wide variety of systems and uses. The term "module" is used to mean any device to which an electronic tag might be attached, or with which a tag might be associated.

Figure 5:
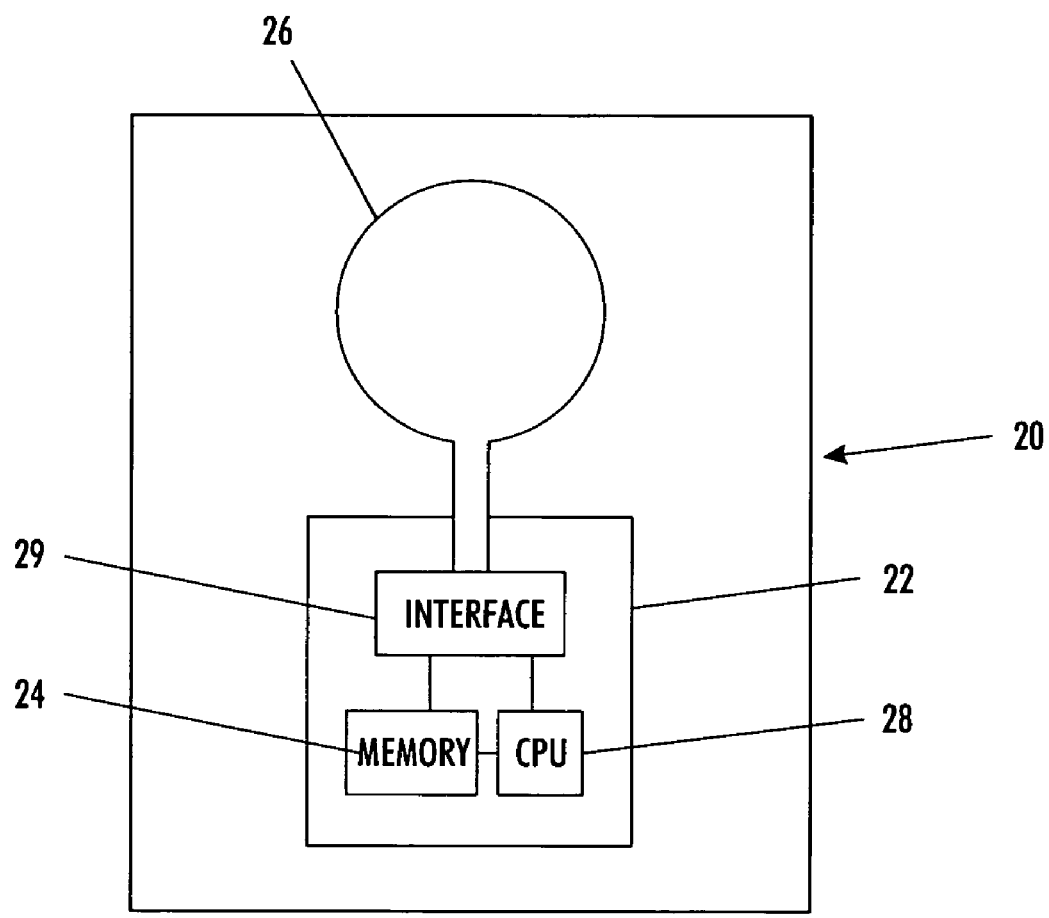
FIG. 5 shows an exemplary implementation of a programmable module tag.

An exemplary electronic module tag 20 is shown in FIG. 5. The electronic tag includes tag electronics 22 that include tag memory 24 for storing information, and a tag communication element 26 for communicating information to and from the electronic module tag. A processor (CPU) 28 provides computational and other capabilities. Interface electronics 29 connect the CPU 28, memory 24, and communication element 26. Many configurations are available for arranging and connecting elements of the electronic module tag.

In a particular implementation, the communication element 26 is a wireless communication element for establishing a wireless communication link with another device. In a particular implementation, the wireless communication element is a radio frequency (RF) antenna for establishing a radio frequency communication link with another device.

The wireless communication element can be an active element, powered by a power source, such as a battery (not shown) embedded on the tag. Alternatively, the wireless communication element can be passive. Such a passive element is energized by the RF signal it receives from another device, such as an RF reader that queries the tag, or an RF writer that delivers information to the tag. Energy from the reader or writer is sufficient to briefly power the RF antenna and interface electronics to enable the RF antenna to receive and transmit information.

Information is stored in the tag memory contained within the tag electronics. Particular information can be stored at particular locations in the tag memory. One path for receiving information to store in the tag memory is through the RF antenna. Information can also be read from the memory. When the communication element is activated, the RF antenna can transmit selected information from the tag memory.

In addition to, or in lieu of, the wireless communication element 26, a wired communication element (not shown) may connect the tag memory 24 through a plug or other connector to an external communication system for delivering information to, and drawing information from, the tag memory.

Figure 2:
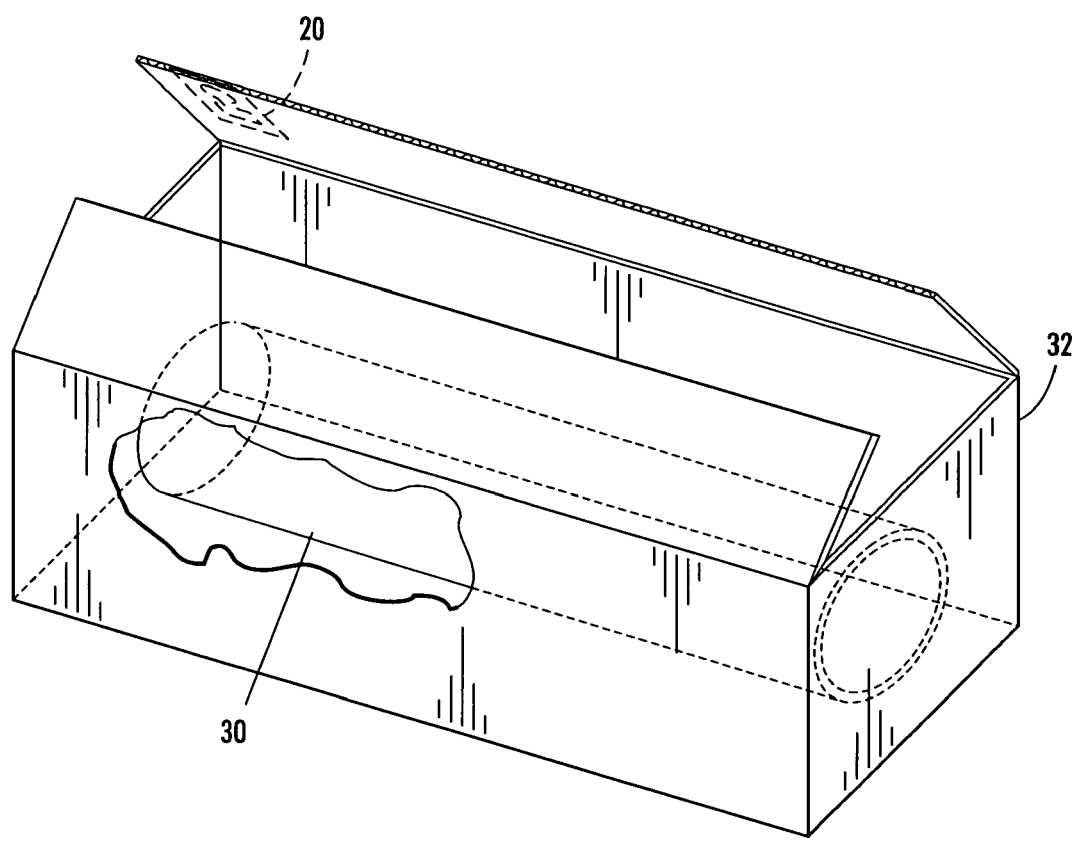
FIG. 2 shows an exemplary application of a programmable module tag to a container for a module.
Figure 3:
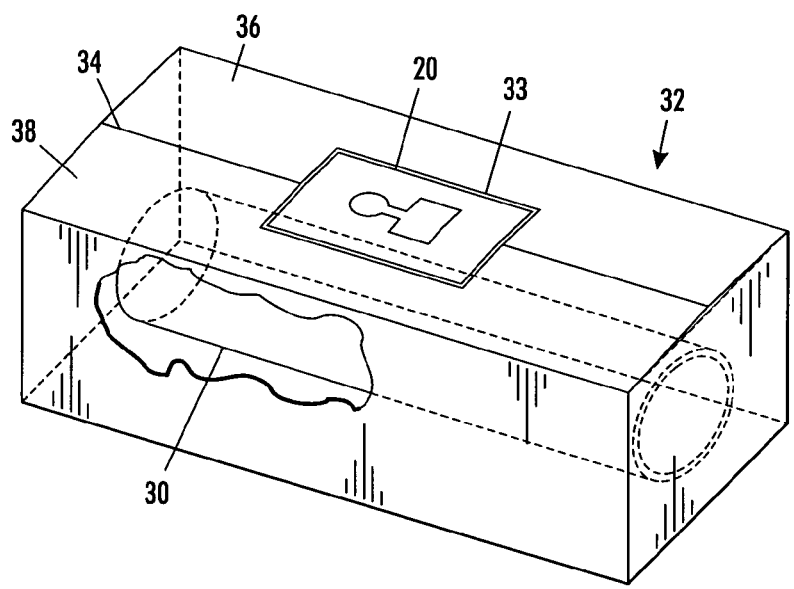
FIG. 3 shows another application of a programmable module tag to a container for a module.
Figure 4:
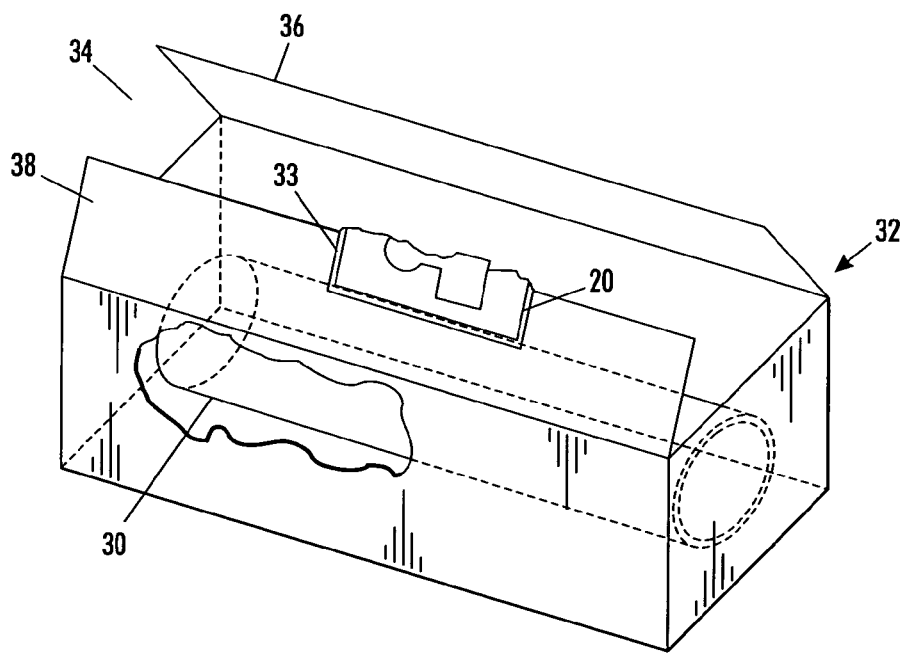
FIG. 4 shows the programmable module tag applied as shown in FIG. 3, after the container has been opened.

The electronic module tag 20 can be attached directly to the toner cartridge module 30, as shown in FIG. 1. In addition, or in alternatives, the module 30 is enclosed within a container 32 for storage and transport, as shown in FIGS. 2–4. As seen in the embodiments of FIG. 2, the tag 20 is embedded in the material forming the container (such as corrugated cardboard). Although a rectilinear container is shown, other shapes can be used for the container. In addition to the replaceable module for the printing apparatus, the container may also enclose packing material (not shown) to protect the enclosed module. In some instances, the container may enclose multiple modules, which may be identical to one another, or may form a set of related modules. The module, such as the toner cartridge 30, is associated with an electronic module tag 20 on the container 32 by placing the module in the container having the programmable electronic tag 20. The module enclosed within the container may or may not have a separate electronic tag 20 affixed directly to the module (FIG. 1).

In an example shown in FIGS. 3 and 4, the electronic tag 20 is attached with a label 33 to the container 32. One portion of the container (shown in FIG. 3 as the top) has an opening separation 34 that is adapted to expand upon opening the container. In the particular implementation illustrated, the opening separation is formed in the top surface by forming the top surface as two sections 36, 38 of container material that meet at a seam forming the opening separation 34. The container with the opening separation expanded to open the container is shown in FIG. 4. Other types of opening separations are also known. For example, the container may be formed of a container body with an open side and a separate piece of material to form a lid, having an opening separation that extends around the perimeter of the lid, where the edge of the lid meets the container body. Other types of opening separations might include a pull tab that tears the container material, or that has a line of perforations to permit the pull tab to separate to sections of the container. The label bearing the electronic tag is securely attached to the container, preferably spanning the opening separation.

Information can be stored in the tag memory of the module tag 20 after the module tag has been attached to a particular module, attached to the container enclosing a particular module, or in some other manner associated with a particular module. Thus, information can be added to the tag memory at different times and when the module is at different locations.

A tag programmer 40 (FIGS. 6 and 7) is adapted to program the module tag 20 after the module tag has been associated with a particular module. The tag programmer is adapted to cause information to be stored in the tag memory of a tag associated with a particular module.

Figure 6:
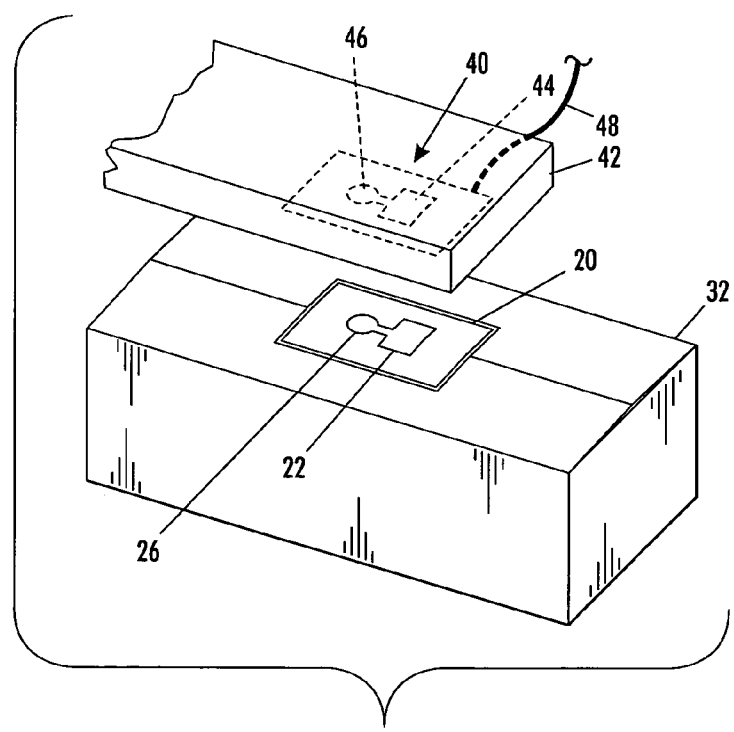
FIG. 6 illustrates a use of a portable tag programmer to program a module tag.
Figure 7:
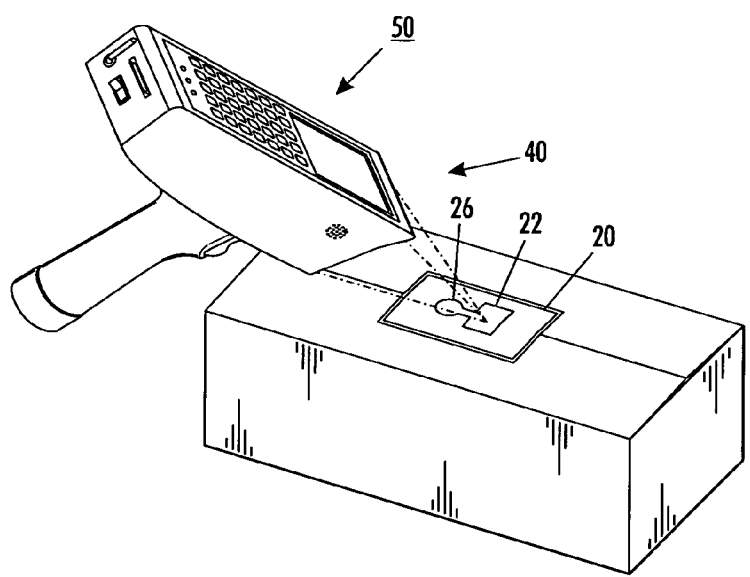
FIG. 7 illustrates a use of a portable tag programmer to program a module tag.
Figure 8:
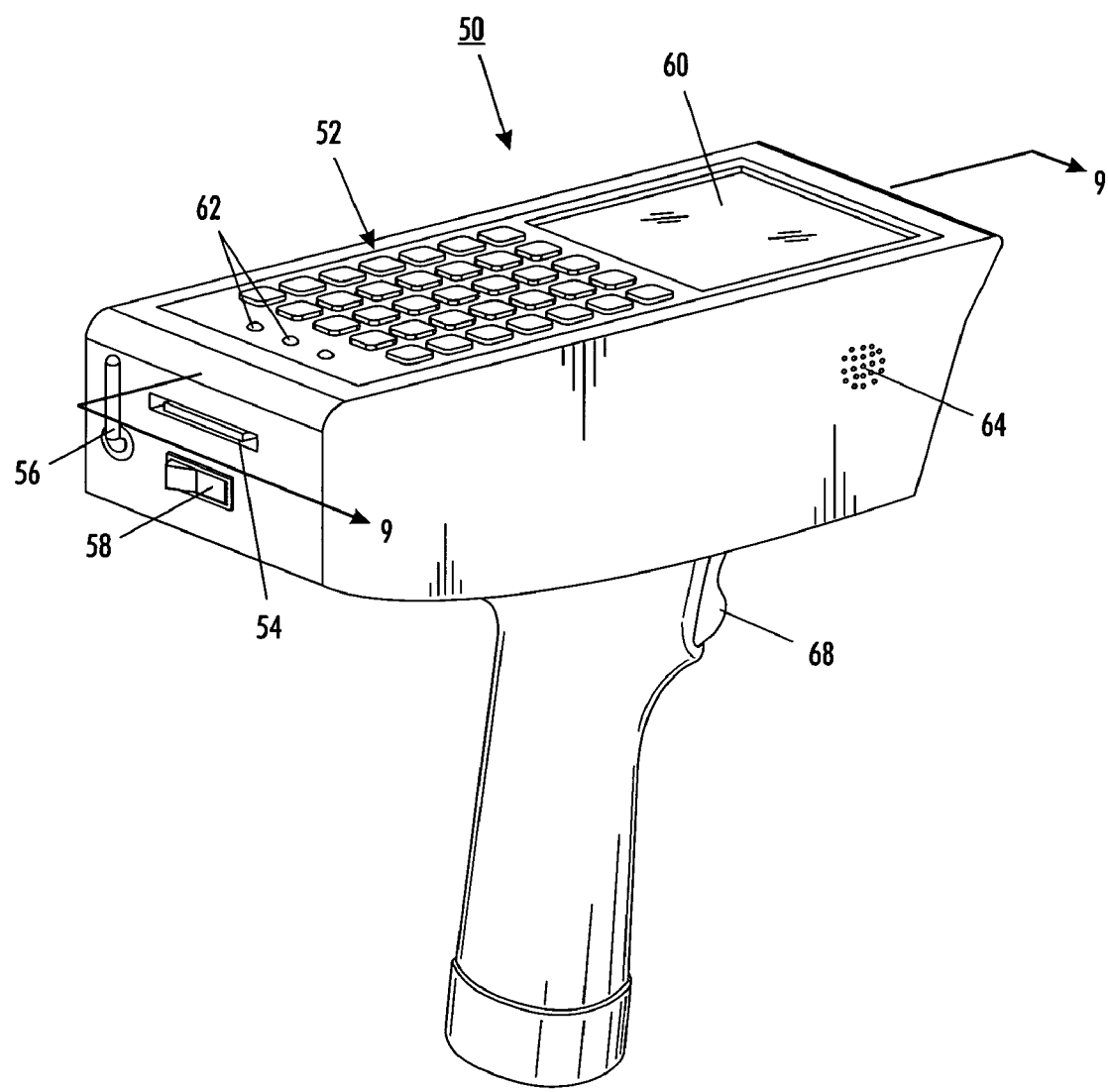
FIG. 8 is a perspective view of one implementation of a portable module tag programmer.
Figure 9:
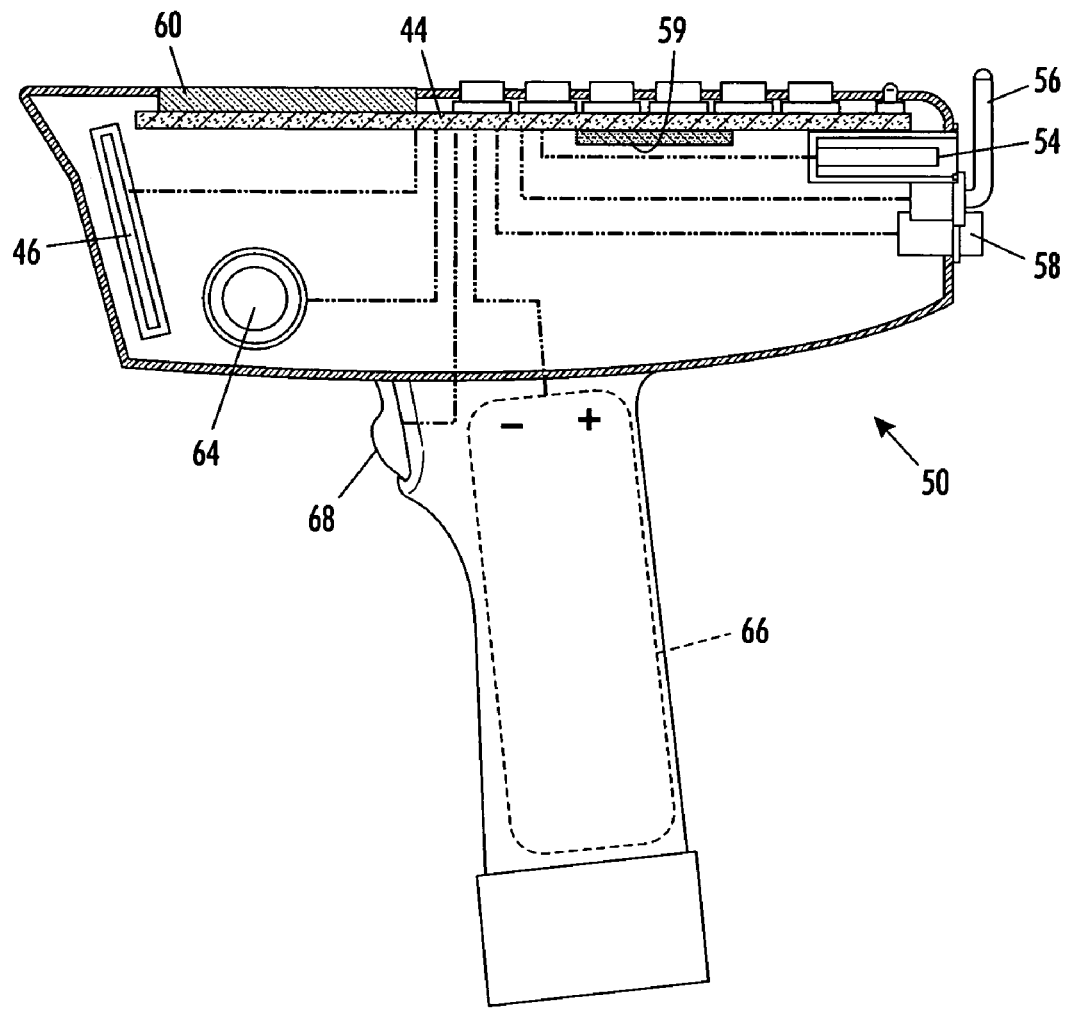
FIG. 9 is a cross-sectional view of the portable module tag programmer of FIG. 8, taken along line 9—9 of FIG. 8.
Figure 10:
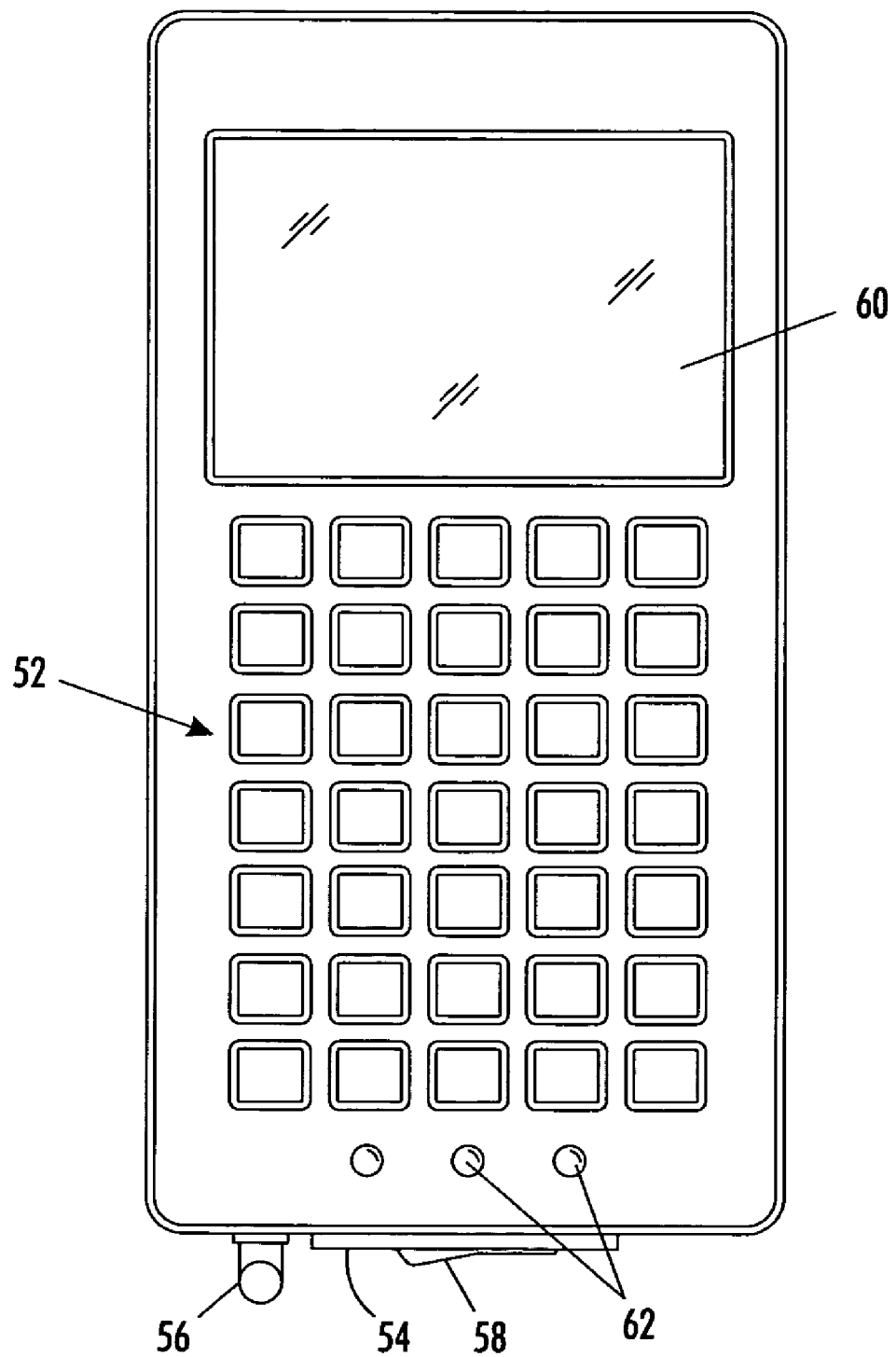
FIG. 10 is a top view of the portable module tag programmer of FIG. 8.
Figure 11:
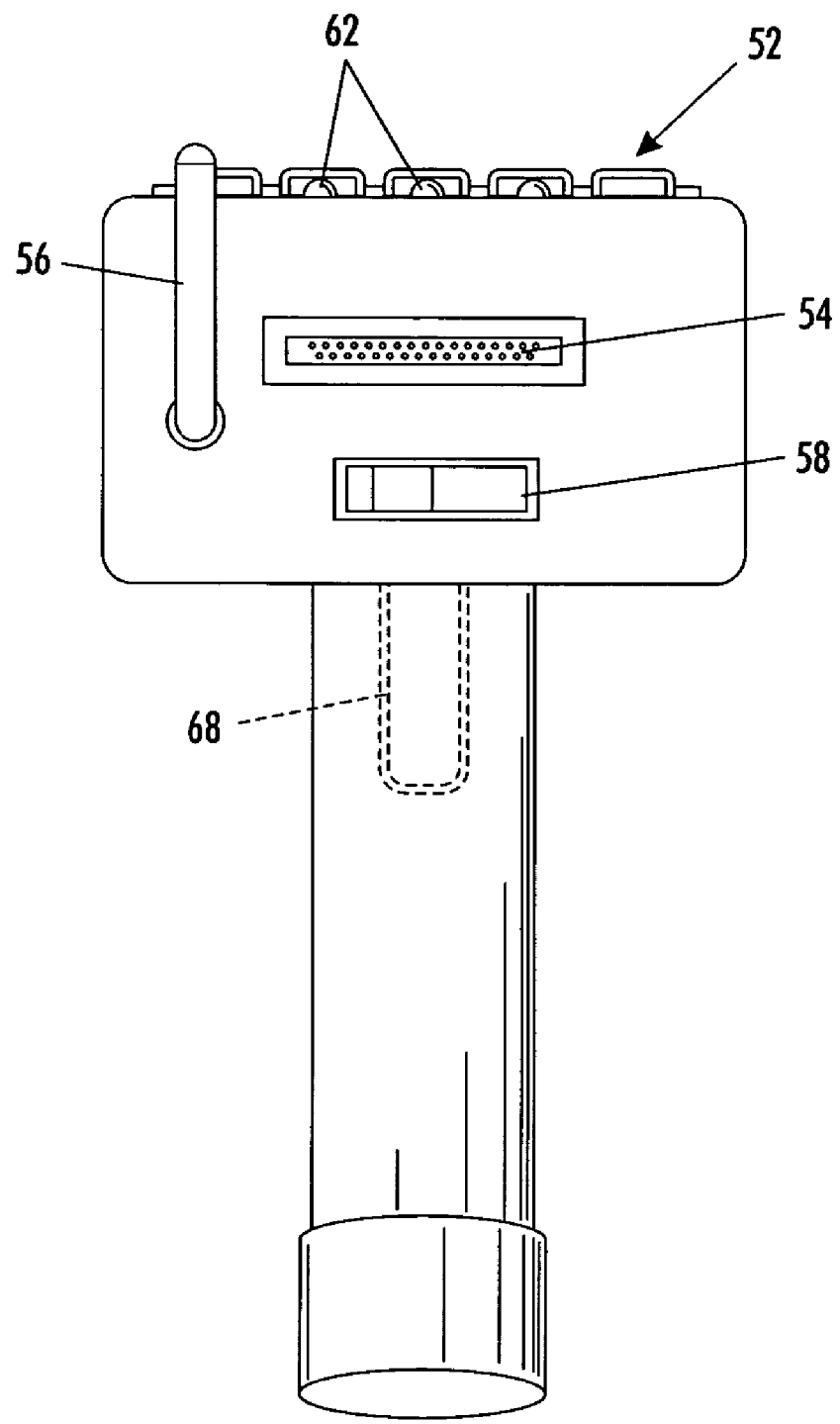
FIG. 11 is a rear end view of the portable module tag programmer of FIG. 8.

The tag programmer 40 may have a fixed location, as shown in FIG. 6. The tag programmer is secured to a programmer fixture 42. The stationary tag programmer and its fixture are configured so that a module or a container enclosing a module, bearing a programmable electronic module tag, can be brought into proximity with the tag programmer. In other implementations, the tag programmer may be included in a portable tag processing device, as shown in FIG. 7.

The tag programmer 40 includes a tag reader that can electronically read information from the electronic module tag, and a tag writer that can program information into the electronic module tag. In either the fixed or portable tag programmer, most, if not all, components may be shared between the tag reader and the tag writer. The tag programmer 40 includes tag programmer electronics 44 (shown stylistically), and a tag programmer communication element 46. The tag programmer communication element 46 communicates with the tag communication element 26 of the electronic tag to form a communication link between the tag programmer and the electronic module tag.

In an example, the tag programmer communication element 46 is a wireless communication element, such as an RF antenna. The RF antenna of the tag programmer emits sufficient energy to energize the RF antenna of the wireless communication element 26 of the tag when the tag programmer communication element 46 and the tag communication element 26 are within a predetermined operating range of one another. Thus, the tag programmer establishes a communication link between the tag programmer and the electronic tag.

Once a communication link is established between the tag programmer and the electronic tag, the tag programmer and the electronic tag can exchange information across that communication link. Although a radio frequency wireless communication link is shown, other types of communication links can also be used. For example, wires connected with plugs or sockets (not shown) can provide wired communication links between the tag reader and the electronic tag. An external communication link provided by, for example, a wire or cable 48, allows data to pass to and/or from the tag programmer to another system, such as a computer or other information management system.

A tag processing device 50 incorporating the tag programmer 40 includes user interface components. Such user interface components include a user input element so a user can provide information to the tag programmer, and a user notification element so the tag programmer can convey information to the user.

An exemplary portable tag processing device is shown in FIGS. 8–11. The user input element includes a keypad 52 connected to the programmer electronics 44. The keypad provides a means for a user to supply input information, such as programming instructions, to the processor electronics 44 of the tag programmer. In another implementation, a microphone and voice recognition capabilities can be used as a user input element. Such a microphone and voice recognition capability can reside on a computer, and be connected through a wired communications port 54 to provide user input signals from the computer to the tag programmer. A connecting device, such as a cable, is selectively attached to the wired communications port. The progammer electronics of the tag processing device may include device memory for storing information during operation. Internal storage allows the tag processing device to download (or upload) data and information at intervals. This capability to store information allows tag processing device to be operated for a time without being in continuous communication with an external system through the communications port.

Figure 12:
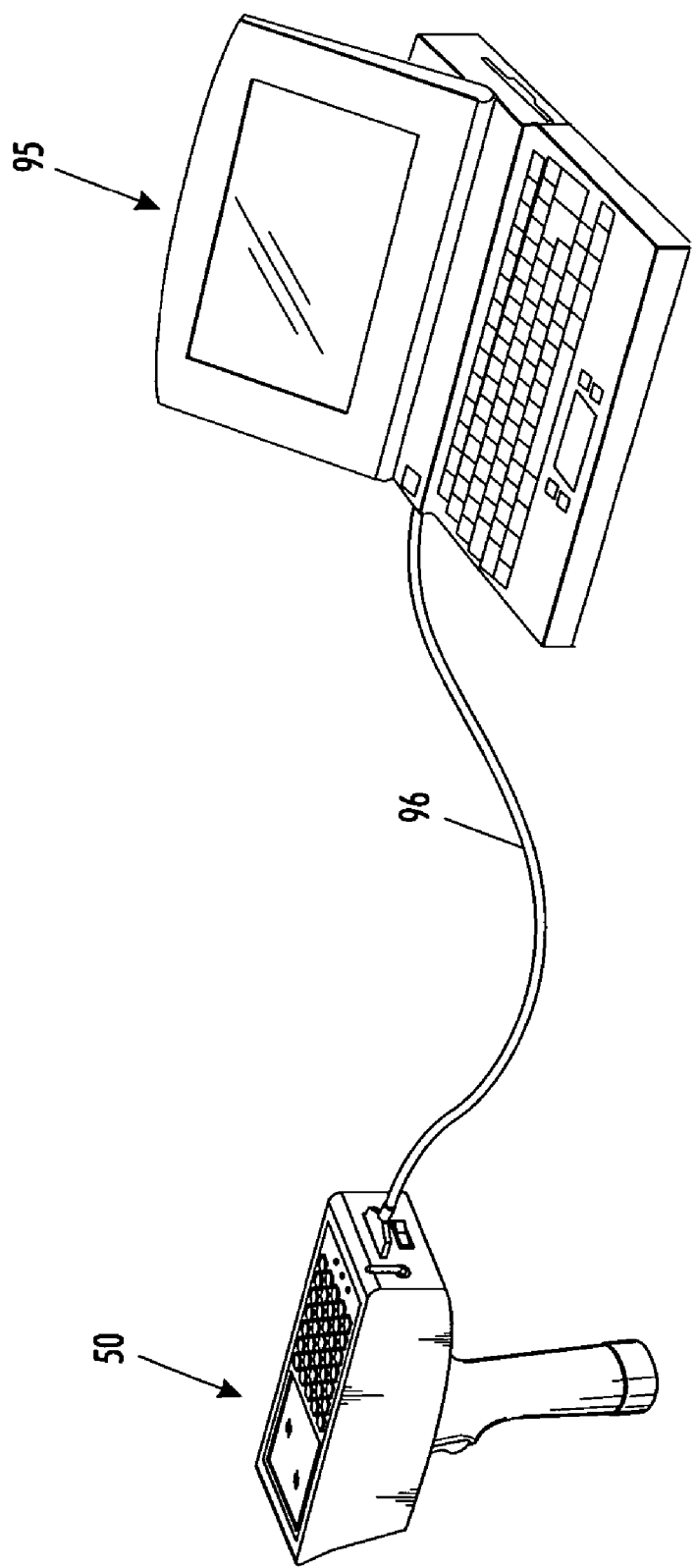
FIG. 12 is a perspective view of a system incorporating a module tag programmer.

In other implementations, the user can supply input information through a computer, using the computer's keyboard or mouse. An exemplary arrangement is shown in FIG. 12 including a portable computer 95 connected to the tag processing device 50 through a cable 96. One end of the cable is attached to the tag processing device through the wired communications port 54. The other end of the cable attaches to the portable computer through one of the several ports typically available on a computer, such as a parallel (printer) port, a serial port, or a USB (universal serial bus) port. The information input to the computer can be translated as user input signals from the computer to the tag programmer through the communications port 54. Communication to the portable tag programmer can also be conducted wirelessly, such as with infrared or radio frequency signals. An external antenna 56 provides an exemplary connection point for receiving user input information from another element or system over a wireless communication link. An antenna switch 58 provides the ability to connect or disconnect the external antenna, or to transfer communication capability between the external antenna and the communications port 54. Persons familiar with the art will identify other mechanisms for supplying information from a user to the tag processing device 50 for use by the tag programmer.

The tag programmer electronics 44 include a data processor 59. The data processor processes data received at the programmer communication element 46, and also information received from the user input element 52. The data processor manipulates the data according to predetermined criteria. For example, the data processor can be adapted to interpret instructions received from the user input element, to verify information that is received from a module tag over the programmer communication element 46, or to perform calculations upon data received from the module tag. The tag programmer processor is also adapted to cause certain information to be communicated to the module tag, such as by transmitting the information over the programmer communication element 46.

The user interface of the tag processing device also includes user notification elements for communicating information to the user. The user notification elements may include a graphical user interface 60, signal lights 62, and/or an audio output 64. The graphical user interface is adapted to display graphical or text messages, and may be a liquid crystal display (LCD) screen. The programmer electronics controls the messages displayed on the graphical user interface. The graphical user interface can also display information confirming the data entered by the user on the keypad 52.

Signal lights 62 can provide simple visual signals to the user. For example, two signal lights may be included, with one red to indicate a negative condition or result, and the other green to indicate a positive condition or result. A third signal light may indicate a separate function, such as a power-on condition, or may provide a tri-level condition indicator. Other embodiments may have other numbers of signal lights. The signal lights may be light emitting diodes (LED's) or other light emitting devices.

An audio output, such as a speaker 64, is adapted to provide additional user notification by emitting one or more audible signals. Different types of audible signals may signal different conditions. For example, a 'buzzer' tone may indicate a negative condition or result, while a 'beep' tone may indicate a positive condition or result. Audible signals can be used to draw attention to certain conditions. In certain instances, simple signaling devices such as the signal lights and the audio signal output may be able to provide sufficient information to the user, eliminating the need for the graphical user interface.

For extended portability, the portable tag processing device 50 is powered by a self-contained battery 66. A switch 68 allows the user to selectively turn the tag processing device on and off. In other examples, the portable tag processing device is tethered to a power source with a power cord (not shown).

Although not shown, various of the user interface elements shown and described in connection with the portable tag processing device 50 can be included with the stationary tag programmer shown in FIG. 6.

In certain applications, it may be useful to limit the amount of the tag programmer and other elements of the tag processing device that are positioned at the point of use at which the tag programmer to be proximate the module or module-enclosing container having the programmable module tag. For example, only the tag programmer antenna 46 and some immediate support electronics may be at the point of use. Other portions of the processor electronics and the user interface elements can be positioned remote from the point of use, connected to the tag programmer antenna by additional communication elements (not shown).

FIGS. 6 and 7 conceptually illustrate programming the electronic module tag that is associated with a module. Although the drawing shows an arrangement in which the programmable electronic module tag 20 is secured to a container 32 enclosing the module, persons skilled in the art will recognize that the process can also be applied to an electronic module tag attached to the module itself. The process can be applied to a module having an attached module tag whether the module is enclosed within a container or outside of a container.

With the tag programmer 40 stationary, as shown in FIG. 6, the electronic module tag 20 is brought into proximity with the tag programmer by bringing the module with which the electronic module tag 20 is associated into proximity with the tag programmer. For example, the container 32 enclosing the module 30 (FIG. 3) and bearing the electronic module tag 20 is brought close enough to the stationary tag programmer that the communication link is established between the electronic module tag and the tag programmer. The communication link is established through the tag programmer communication element 46 and the module tag communication element 26. With the portable tag processor 50 including a tag programmer, the tag programmer can be moved into proximity with the tag 20 to be programmed.

Figure 13:
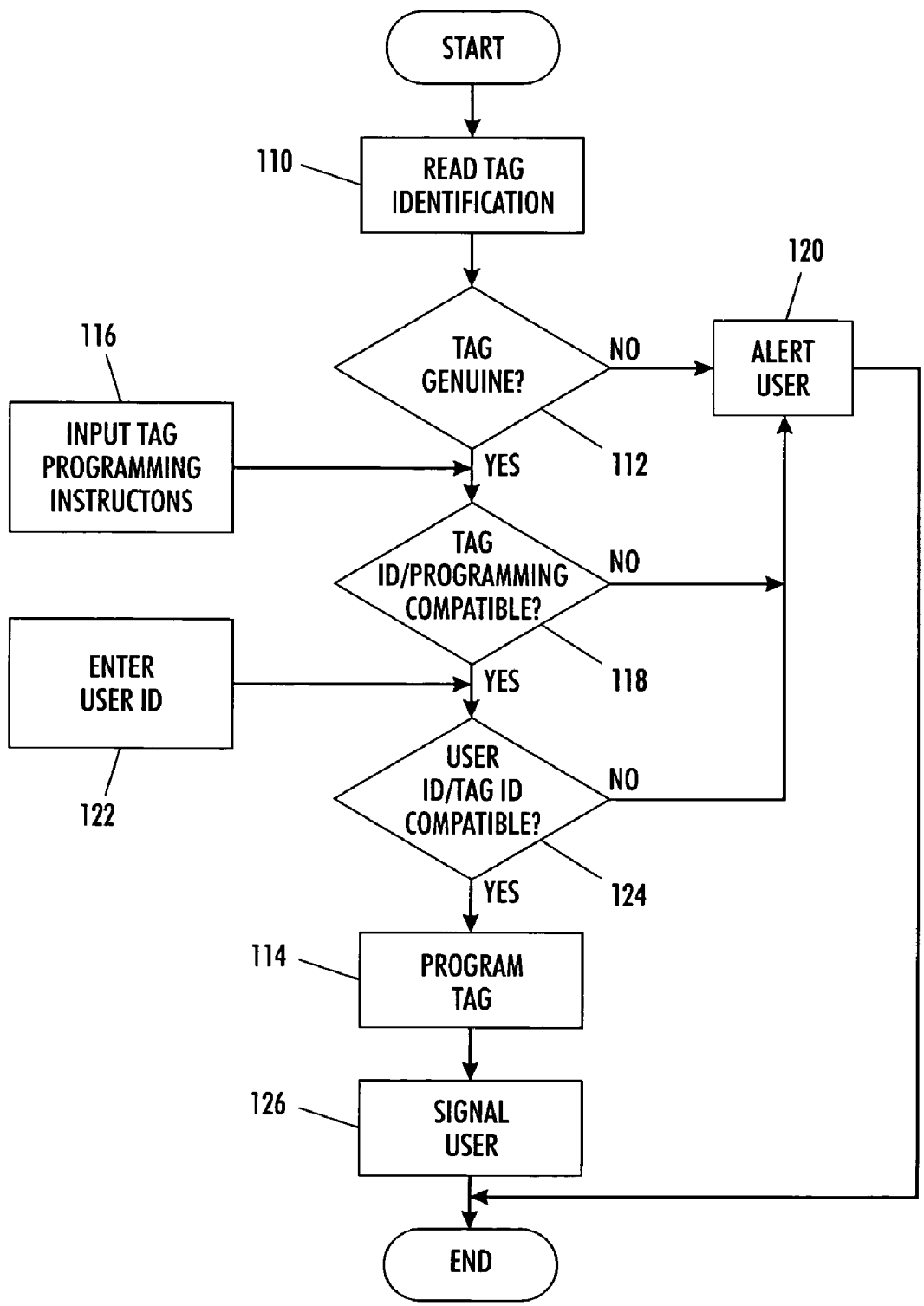
FIG. 13 is a simplified flowchart of a tag programming process.

Referring to FIG. 13, when a communication link is established between the tag programmer and the electronic module tag, the tag reader of the tag programmer 40 can read information from the tag memory 24 of the electronic module tag 20 (FIG. 5). For example, the tag reader may read tag identification information from the tag memory 110. Such tag identification information may include authentication information that the tag reader can use to verify the genuineness of the electronic module tag. In addition to, or instead of, authentication information, the tag reader may read other identification information that identifies a model number or a configuration status for the module with which the electronic module tag is associated. The user may press a special purpose button on the keypad 52 of the tag processing device to initiate the tag reading process. Or the tag processing device may be configured to periodically emit tag reading instructions whenever the tag processing device is turned on.

The tag processing device emits an identification request. The tag electronics 22 are configured to respond to the identification request by transmitting a tag response that includes the identification information. The nature of the identification request and the tag response depends on details of design, and may include additional security features. The tag response may include data from particular locations in the tag memory 24. Or, for enhanced security, the tag CPU 28 may calculate a tag response based on particular data from the tag memory, and perhaps information contained in the identification request. Persons familiar with data communication and data security will be familiar with various techniques to provide data and data security over a communication link such as the communication link between the electronic module tag and the tag reader segment of the tag programmer. The tag programmer communication element 46 receives the tag response, and directs the tag response signal to the appropriate reader portions of the tag programmer electronics 44.

The tag programmer communication element 46 receives the response from the module tag. This tag response includes the tag identification information from the electronic module tag. The data processor 44 verifies the tag identity by comparing the identification information in the tag response with predetermined identification criteria to determine if the identification information matches that predetermined identification criteria. Persons familiar with data verification will be familiar with various types of identification criteria, and various techniques for determining if the identification information matches the predetermined identification criteria.

If the data processor of the tag programmer verifies the identity of the eleotronic module tag, the data processor may cause the tag programmer to program the electronic module tag 114. To program the electronic module tag, the data processor causes the programmer communication element 46 to transmit tag content information toward the electronic module tag. The tag communication element 26 receives the transmitted tag content information. The tag electronics 22 are configured to then store the appropriate tag content in the tag memory 24. The tag content may include module configuration setup information, such as described in U.S. patent application Ser. No. 10/849,974, now U.S. Publication No. 20050258228, filed May 20, 2004 by Heiko Rommelmann et al., and entitled "Control of Programmable Modules," the contents of which are hereby incorporated by reference. Such storage can take place in a variety of ways familiar to persons skilled in the art.

The user may be called upon to supply the tag processing device with tag content programming instructions through the user input element of the user interface 116. For example, the user may press a predetermined series of keys on the keypad 52 to cause the tag programmer of the tag processing device to generate a particular set of tag content.

The data processor of the tag programmer can be adapted to confirm that the user instruction for particular tag content is authorized for, or consistent with a particular module. The module can be identified by the identification information on the electronic tag associated with the module. The data processor can compare 118 the identification information received from the electronic tag with predetermined identification criteria for modules authorized to receive the configuration instructions provided by the user. If the tag content is authorized for the identified module, the tag programmer proceeds to program the electronic module tag. If, however, the tag content is not authorized for the identified module, the tag processing device provides a signal to the user 120. Such a signal can be an audible signal on the audio output 64, a visible signal on one or more of the signal lights 62, and/or a message on the graphical user interface 60.

The tag processing device may also be adapted to verify 124 that the user providing tag content programming instructions is authorized to do so, and to submit the particular tag content provided. The tag processing device may prompt the user to input user identifying information. The user may provide 122 such user identifying information through the keypad 52, or the tag processing device may include an identification reader device for reading a key card or other device that is associated with the user.

The tag processing device may be part of the programming system provided with functionality like that described in U.S. patent application Ser. No. 10/634,934 by Alberto Rodriguez et al., Control of Programming Electronic Devices, filed Aug. 5, 2003, the contents of which are hereby incorporated by reference. Such functionality may include security features to control access to the programming capabilities of the programming system.

A variety of combinations of the above features may be included for maximum flexibility of use, and for security. For example, certain users can be authorized to provide only certain types of tag content, or to provide tag content for only certain types of modules (as identified by their tag identification information). A particular user may be authorized to provide only a limited number of programming instructions (i.e., to limit the number of module tags a particular user is entitled to program).

A signal may be provided to the user 126 to indicate successful programming of tag content into the tag. This signal may include illumination of a signal light 62, an audible signal, or a message on the GUI 60.

Information can be added to the tag memory at different times. Thus, certain information, such as the physical configuration of the module enclosed within the container, may be stored in the tag memory at one time, such as upon placing the module in the container. Additional information, such as the marketing part number, may be added at a later time. Yet additional information, such as tracking information indicating a particular distributor warehouse, the particular service technician who installs the module, or other information can be added at later times. Thus, tracking information can be stored in the tag memory attached to the container, so that the container itself retains a history of where it has been, and what steps have performed upon it. In this way, a subsequent tag reader can access this information and identify the history of the container enclosing the module, without requiring that the tag reader access a central tracking system.

Figure 14:
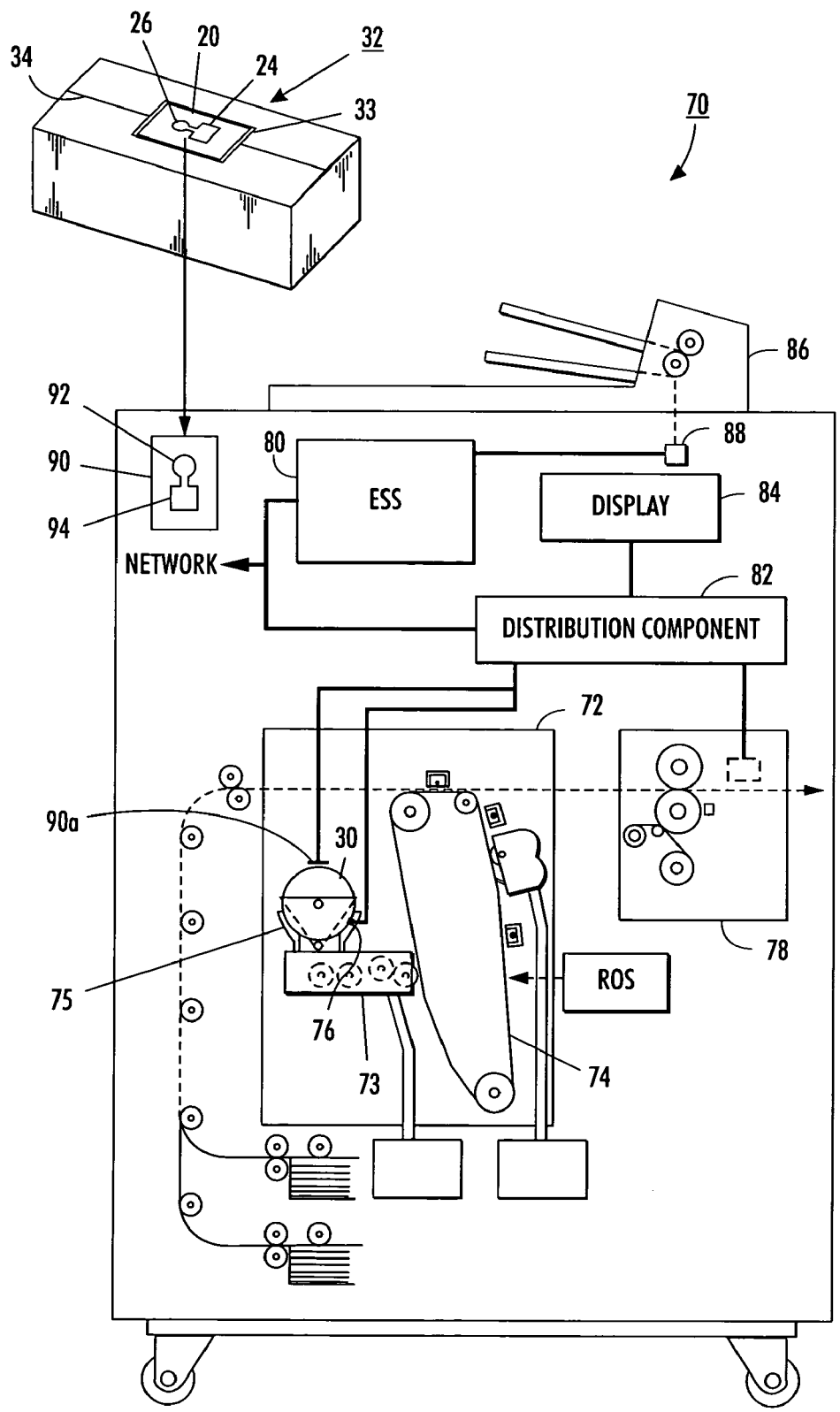
FIG. 14 is a conceptual illustration of a printing apparatus incorporating one implementation of a module tag reader.

FIG. 14 shows a representative printing apparatus 70 that might use the module 30 enclosed within the container 32. The representative printing apparatus includes a printing subsystem 72, which, in the illustrated example, is a xerographic printing subsystem that includes a photoreceptor 74, and a developer 73. A toner cartridge, such as the toner cartridge module 30 enclosed within the container, is inserted into the printing subsystem. The developer draws toner from the toner cartridge into the developer. The printing apparatus additionally includes a fuser subassembly 78, an electronic subsystem 80 for processing control signals, and a distribution component 82 for controlling the distribution of electronic signals from the electronic subsystem to the printing subassembly and the fusing subassembly. The distribution components may also deliver information to a graphical display 84 for conveying information to the machine user. The printing apparatus may include a copying function, in which case a document handler 86 passes documents past a scanner 88.

The printing apparatus includes a printer tag reader 90 that includes a wireless reader communication element 92 for receiving information transmitted by the communication element 26 of the module tag 20. The tag reader on the printing apparatus includes reader electronics 94 and an RF antenna forming the wireless reader communication element 92. The RF antenna emits radio frequency signals of sufficient strength to energize the RF antenna forming the tag communication element 26 on the tag when the tag is brought into proximity with the printer tag reader. Upon being energized, the tag communication element transmits information stored in the tag memory portion of the tag electronics 24. The wireless reader communication element 92 receives that information, and either processes the information within the printer tag reader electronics 94, or transmits the information it to the printer electronic subsystem 80 of the printing apparatus.

The printer tag reader electronics 94 or the printer electronic subsystem 80 analyze the tag information received from the module tag 20. The tag information read and analyzed by the printer tag reader electronics 94 or the printer electronic subsystem 80 includes the configuration information stored in the tag memory by the tag programmer 40. The analysis may be to verify that the tag information indicates that the module enclosed in the container is appropriate for the particular printing apparatus by comparing the tag configuration information with predetermined configuration parameters. For example, the printer electronic subsystem may verify that the tag information indicates that the module is intended for a printing apparatus with the appropriate type of maintenance agreement that covers the particular printing apparatus 70. In an alternative, the electronic subsystem may use the tag information from the tag on the container to determine the type of material in the container. The printer electronic subsystem 80 may be configured to perform various actions depending on the information received. For example, the information received from the tag may indicate to the electronic subsystem how the printer should be configured to take advantage of the module contained in the container. The electronic subsystem can also be configured to issue a notice on a printer user interface, such as a graphical display 84, if the tag information read from the module tag indicates that an incorrect module is being presented to the printing apparatus. The electronic subsystem may even be programmed to block insertion of the module into the printing apparatus if the information read from the tag memory does not agree with the expected information.

In certain implementations, a module tag 20 is attached directly to the module 30 so that the contents of the module tag can be read by a printer tag reader 76 in the printing apparatus during use of the printing apparatus. The printing apparatus may be adapted so that if the printing apparatus, through the printer tag reader, determines that the module tag is programmed with one set of configuration information, the printing apparatus operates in a first manner, or if the module tag is programmed with a second set of configuration information, the printing apparatus operates in a second, different manner. If the module is a toner cartridge for a developer 73, such differences may include adjustments such as altering the concentration of toner deposited by the developer onto the photoreceptor 74. Or the differences may include adjustments to the methodology the printing apparatus uses to estimate toner usage, or other factors affecting printer performance.

Referring, for example, to FIG. 15, the printer tag reader 90 is installed adjacent where the module 30 is to be installed. For example, the printer may include an insertion tray 75 to receive the toner module. The printer tag reader 76 may be contained in the insertion tray. In other implementations, a printer tag reader 90a is mounted adjacent the insertion tray, or along the path that the module 30 takes as the module is inserted into the printer. The printer tag reader 90a includes a wireless communication element 92a and reader electronics 94a.

While the invention has been described in the context of particular implementations, those skilled in the art, after studying the present disclosure, will recognize the various modifications can be made without departing from the spirit of the invention. Such modifications may include different configurations for the electronic module tag, different types of tag programmers and readers, and different placement of the electronic tag on the module, or on a container for enclosing the module. In addition, the module enclosed within the container can be a module other than a toner cartridge, and may include any type of replaceable module for a printing apparatus. Furthermore, the electronic tag can be used for modules other than replaceable modules for printing apparatus. Therefore, the scope of the invention is not to be limited to the specific implementations described above.

We claim:

1. A method of programming an electronic monitoring tag attached to a printing apparatus replaceable module, the method comprising:
   electronically reading tag identification data from an electronic monitoring tag associated with the replaceable module;
   electronically verifying that the tag identification data matches predetermined identification criteria; and
   if the tag identification data matches the predetermined identification criteria, electronically programming the electronic monitoring tag with tag content.

2. The method of claim 1, wherein programming the electronic monitoring tag with tag content comprises selectively programming the electronic monitoring tag with first configuration information or with second configuration information.

3. The method of claim 2 additionally comprising:
   providing user input information comprising first configuration setup information or second configuration setup information; and
   programming the electronic monitoring tag comprises programming the electronic monitoring tag with first configuration information if the user input information comprises first configuration setup information, and programming the electronic monitoring tag with second configuration information if the user input information comprises the second configuration setup information.

4. The method of claim 2, additionally comprising:
   transmitting first operating information to a printer if the electronic monitoring tag has been programmed with the first configuration information; and
   transmitting second operating information to a printer if the electronic monitoring tag has been programmed with the second configuration information.

5. The method of claim 1, wherein:
   verifying that the tag identification data matches the predetermined identification criteria comprises determining whether the tag identification data matches a first predetermined identification criteria or a second predetermined identification criteria; and
   programming the electronic monitoring tag with tag content comprises programming the electronic monitoring tag with first configuration information if the tag identification data matches the first predetermined identification criteria, or programming the electronic monitoring tag with second configuration information if the tag identification data matches the second predetermined identification criteria.

6. The method of claim 5, additionally comprising:
   reading tag authentication data from the electronic monitoring tag;
   verifying that the tag authentication data matches predetermined authentication criteria; and
   programming the electronic monitoring tag with tag content only if the tag authentication data matches the predetermined authentication criteria.

7. The method of claim 6, wherein reading the tag authentication data comprises:
   electronically transmitting an authentication request signal to the electronic monitoring tag;
   causing the electronic monitoring tag to calculate an authentication response; and
   electronically receiving the authentication response from the electronic monitoring tag.

8. The method of claim 1, wherein programming the electronic monitoring tag with first tag content comprises programming the tag with tag information relating to the subsequent use of the printing apparatus replaceable module.

9. A programming device for programming electronic monitoring tags that are associated with printing apparatus replaceable modules, the programming device comprising:
   a tag writer adapted to program tag content into electronic monitoring tags;
   a tag reader;
   wherein the tag reader is adapted to read tag identification data from a first electronic monitoring tag associated with a printing apparatus replaceable module; and
   a data verifier in communication with the tag reader;
   wherein the data verifier is adapted to determine if tag identification data matches predetermined identification criteria; and
   wherein the data verifier is adapted to authorize the tag writer to program the tag content into the first electronic monitoring tag only if the data verifier determines that the tag identification data matches the identification criteria.

10. The programming device of claim 9, additionally comprising:
    a user input element for receiving user instructions;
    wherein the tag writer is adapted to program first tag content into the first electronic monitoring tag if the user input element receives a first user instruction, and the tag writer is adapted to program second tag content into the first electronic monitoring tag if the user input element receives a second user instruction.

11. The programming device of claim 10, wherein:
    the data verifier is additionally adapted to determine if the user instructions match predetermined user criteria; and
    the data verifier is additionally adapted to authorize the tag writer to program the tag content into the first electronic monitoring tag only if the data verifier additionally determines that the user instruction match the predetermined user criteria.

12. The programming device of claim 9, wherein:
    the data verifier is adapted to determine whether the tag identification data matches first identification criteria or second identification criteria;
    the tag writer is adapted to authorize the tag writer to program first tag content into the first electronic monitoring tag only if the data verifier determines that the tag identification data matches the first identification criteria; and
    the tag writer is adapted to authorize the tag writer to program second tag content into the first electronic monitoring tag only if the data verifier determines that the tag identification data matches the second identification criteria.

13. The programming device of claim 9, wherein:
    the tag writer comprises a writer wireless communication element for transmitting programming information; and
    the data receiver comprises a reader wireless communication element for receiving the tag identification data.

14. The programming device of claim 13, wherein the writer wireless communication element and the receiver wireless communication element are formed of a single wireless communication element.

15. A programming device for programming electronic monitoring tags that are associated with printing apparatus replaceable modules, the programming device comprising:
a tag writer;
wherein the tag writer comprises a wireless communication element and is adapted to program either first tag content or second tag content into electronic monitoring tags using the wireless writer communication element;
a tag reader;
wherein the tag reader comprises a wireless communication element and is adapted to read tag identification data from a first electronic monitoring tag associated with a printing apparatus replaceable module using the wireless reader communication element; and
a user input element for receiving user instructions;
a data verifier in communication with the tag reader, the user input element, and the tag writer;
wherein the data verifier is adapted to determine whether the tag identification data received by the tag reader matches predetermined tag identification criteria;
wherein the data verifier is adapted to authorize the tag writer to program the first tag content into the first electronic monitoring tag only if the data verifier determines that the received tag identification data matches the tag identification criterion and the user input element receives a first user instruction; and
wherein the data verifier is adapted to authorize the tag writer to program the second tag content into the first electronic monitoring tag only if the data verifier determines that the received tag identification data matches the tag identification criterion and the user input element receives a second user instruction.

16. The programming device of claim 15, wherein the wireless writer communication element and the wireless reader communication element are a common wireless communication element.

17. The programming device of claim 15, wherein:
the tag writer is a portable tag writer; and
the tag reader is a portable tag reader.

* * * * *